H. H. HAM, Jr.
Calculating Attachment for Weighing-Scales.

No. 215,607.                    Patented May 20, 1879.

UNITED STATES PATENT OFFICE.

HENRY H. HAM, JR., OF PORTSMOUTH, NEW HAMPSHIRE.

IMPROVEMENT IN CALCULATING ATTACHMENTS FOR WEIGHING-SCALES.

Specification forming part of Letters Patent No. 215,607, dated May 20, 1879; application filed December 31, 1878.

*To all whom it may concern:*

Be it known that I, HENRY H. HAM, Jr., of Portsmouth, in the county of Rockingham and State of New Hampshire, have invented certain new and useful Improvements in Weighing-Scales; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improvement in that class of scales in which devices are employed to determine the weight of an article, and at the same time the price of the article is indicated on a table; and my invention consists in certain improvements in construction in that class of scales, as will be hereinafter more fully set forth, and pointed out in the claim.

Figure 1:
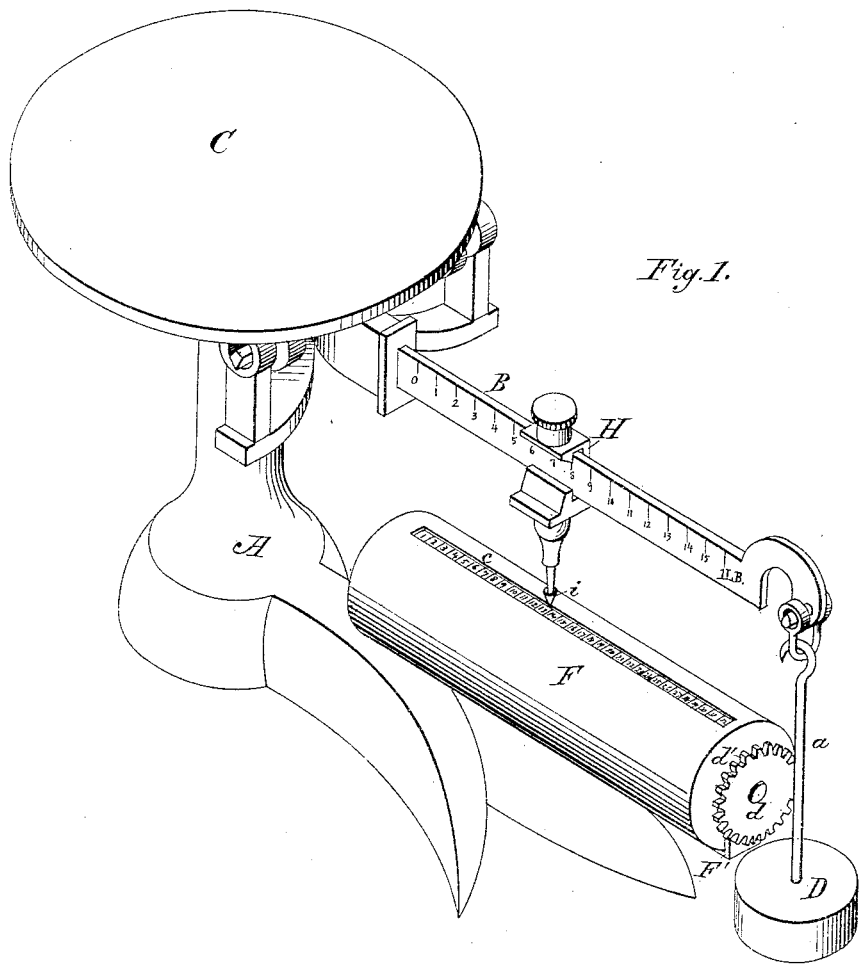
Figure 3:
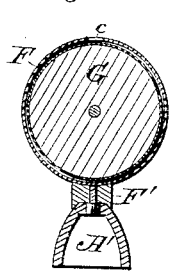
Figure 2:
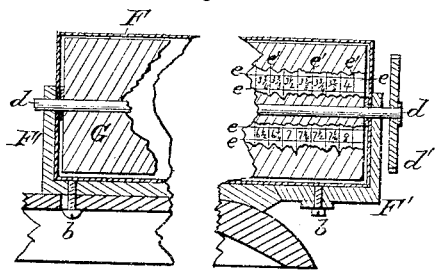

In the drawings, Figure 1 represents an ordinary counter-scale with my improvement attached. Fig. 2 is a longitudinal sectional view of the rotating table or calculator with its case. Fig. 3 is a transverse section of the calculator and case.

A represents the bed of the scale, on which all the other parts of the apparatus are supported. B is the beam of the scale, which supports at one end the platform C, upon which the article to be weighed is placed, while the opposite end is suspended by means of the rod $a$, and the balance-weight D, which also forms a support for the weights employed in the process of weighing that represent units of the weight used.

So far the construction of the apparatus is identical with that in common use; but in order to carry out my invention, I attach to the rearwardly-extending portion, A', of the bed A, and directly beneath the scale-beam, a cylindrical case, F, the use of which will be hereinafter explained.

To render this case easily attached and detached from the scale, it is secured to a supplementary bed, F', that is in turn attached to the extension A' of the bed A by screws $b\ b$, that pass through slots in the part A', thus allowing a slight longitudinal adjustment to the cylindrical case F, which is formed preferably of sheet metal, and is provided with the longitudinal slot $c$, extending nearly from end to end upon its upper side.

In the ends of the upwardly-projecting parts of the supplementary bed F', which supports the case F, are formed journal-bearings for the shaft $d$, which revolves in them and carries the cylinder G, which rotates within the cylindrical case F.

To the outer end of the shaft $d$ is attached a milled wheel, $d'$, or other suitable device for the purpose of giving to the shaft and cylinder G a rotary movement when desired. In order to prevent the cylinder from turning too easily, a spring-washer or equivalent device may be interposed between the end of the cylinder and one of the journal-bearings in which the shaft $d$ revolves, the point aimed at being to so impede the movement of the cylinder by retarding friction that it shall not be displaced by the jars to which such an apparatus is subject. The surface of the cylinder G is divided by the lines $e$, running lengthwise, and the lines $e'$, which encircle it, into rows of rectangular spaces. One or both the end rows or series of spaces encircling the cylinder has engraved or otherwise marked upon it the cost of a pound, ounce, or whatever other unit of weight is used. The spaces in a series extending longitudinally from each of those containing the price of the unit of weight is occupied by the price of a fraction of that unit, so that when sliding weight H upon the scale-beam balances an article upon the platform C, the cost of a unit of which article is visible upon one end of the cylinder G through the slot $c$, the index or pointer $i$, extending downward from the movable weight, will be over and point out the rectangular space in the series of spaces extending longitudinally from that containing the price of a unit containing the cost of the fractional part of the article upon the platform.

By turning the cylinder G, any unit price upon its periphery may be brought opposite the slot, and the cost of fractional parts thereof determined instantly by the simple act of weighing it upon the scale without any mathematical mental effort.

I am aware that a graduated scale-beam provided with a sliding balance-weight having a pointer has heretofore been employed in connection with a revolving scale-priced cylinder, by means of which both the weight of an article and its price can be seen, and I therefore lay no claim, broadly, to such invention, my invention being confined to certain details of construction pointed out in the claim.

Having thus described my invention, I claim as new, and desire to secure by Letters Patent, the following:

The combination, with the rearward slotted extension, A', of the bed A, of the supplementary bed F', screws $b\ b$, longitudinally adjustable and slotted cylindrical case F, shaft $d$, carrying the scale-priced cylinder G, said shaft having its bearings in projections attached to the bed F', scale-beam B, and sliding weight H, having a pointer, $i$, substantially as shown, and for the purposes set forth.

In testimony that I claim the foregoing as my own I hereunto affix my signature in presence of two witnesses.

HENRY H. HAM, JR.

Witnesses:
F. H. SCHOTT,
E. A. DICK.